United States Patent [19]

Nott

[11] 4,234,078
[45] Nov. 18, 1980

[54] CONVEYOR BELT DRIVE APPARATUS

[76] Inventor: Frank J. Nott, 14 Garnet Leary Ave., Black Rock, Victoria, Australia

[21] Appl. No.: 909,599

[22] Filed: May 25, 1978

[30] Foreign Application Priority Data

Jun. 14, 1977 [AU] Australia .............................. PD0432

[51] Int. Cl.³ .............................................. B65G 23/14
[52] U.S. Cl. .................................... 198/833; 198/824; 428/167; 474/85
[58] Field of Search ............... 198/689, 811, 823, 824, 198/830, 833; 74/231 R, 231 CB; 428/167; 271/197

[56] References Cited

U.S. PATENT DOCUMENTS

| | | | |
|---|---|---|---|
| 2,314,294 | 3/1943 | Wallny | 198/823 X |
| 2,549,729 | 4/1951 | Wallny | 198/833 X |
| 2,650,695 | 9/1953 | Robins | 198/833 X |
| 2,692,041 | 10/1954 | Campbell | 198/811 |

FOREIGN PATENT DOCUMENTS 2511456  9/1976  Fed. Rep. of Germany ........... 198/833
 829876  3/1960  United Kingdom ..................... 198/833

Primary Examiner—Jeffrey V. Nase
Attorney, Agent, or Firm—Sughrue, Rothwell, Mion, Zinn & Macpeak

[57] ABSTRACT

Conveyor belt drive apparatus in which an endless looped traction belt engages the main conveyor belt and is driven around the loop to impart driving forces to the main belt. The face of the traction belt which engages the main conveyor belt has a series of open facial pockets and holes extend through the traction belt between the pockets and the reverse or inner face of the belt. A stationary suction chamber structure confronts the inner face of the belt to form therewith a suction chamber such that suction is applied via the holes to the pockets of the traction belt in the region where the traction belt engages the main conveyor belt to provide suction clamping action between the belts.

9 Claims, 6 Drawing Figures

CONVEYOR BELT DRIVE APPARATUS

BACKGROUND OF THE INVENTION

This invention relates to conveyors and has particular application to belt conveyor drives.

In many applications belt conveyors may extend over long distances and may be required to carry very heavy loads. Coal and ore conveyors, for example, may extend over long distances from mining sites to shipping or rail facilities. Such conveyors are generally formed by long flexible belts arranged in endless loops with an upper load carrying runs and lower return runs, the upper runs being supported at intervals by idler roller sets, commonly in a troughed configuration. Each belt loop is driven by a roller drive at the forward end of the loop in the direction of travel of the upper run. With this arrangement tensile forces in the upper loaded run of the belt increase continuously throughout the length of the run to reach a maximum at the front end. This build up of tensile forces puts a practical limit on the length of each belt loop. With modern steel reinforced conveyor belts this practical limit is of the order of 15 kilometres, depending on the terrain.

It has been known to provide intermediate drives for long conveyor belts for the purpose of applying traction forces to loaded belt runs at intervals along their length so as to limit the build up of tensile forces in the belt and permit the use of longer belt runs. These previous proposals have involved use of friction drive belts engaged with the underside of the loaded run of the main conveyor belt. However, such previously proposed intermediate drives have not been satisfactory. In order to generate effective traction forces the friction belt must engage the conveyor belt over quite a long distance. Moreover, discontinuities in the load in the conveyor belt reduce the interface pressure between the conveyor belt and the friction drive belt with consequent loss of traction and rapid build up of excessive tensile forces in the conveyor belt. As a consequence such intermediate drive equipment has not been widely adopted.

There have been previous proposals to provide intermediate drive equipment in which traction elements are held to the conveyor belt by suction clamping. Such equipment is disclosed in U.S. Pat. No. 2,650,695 to SAMUEL D. ROBINS and U.S. Pat. No. 2,692,041 to W. S. CAMPBELL. In the Robins equipment, the traction elements are in the form of individual metal trays carried on drive chains to engage the underside of the conveyor belt and defining suction cups which can be evacuated. The suction cups are formed in two rows extending one along each side of the conveyor belt and are evacuated through individual vacuum tubes permanently connected to the trays and extending to a common vacuum manifold disposed to one side of the conveyor belt. Stationary suction nozzles project through slits in the moving manifold to create a localized vacuum zone within the manifold such that the suction cups are evacuated only when in contact with the conveyor belt.

The Campbell equipment comprises a traction belt provided with lateral grooves which are evacuated by stationary suction nozzles inserted between the edge margins of the conveyor belt and traction belts.

The Robins and Campbell arrangements are quite complicated and involve sliding vacuum seals which would be difficult to maintain under rugged service conditions. Moreover, the application of vacuum from the sides of the conveyor belt severely limits the suction clamping effect which can be achieved and in particular the tractive effort that can be applied to the central region of the conveyor belt where the loading is heaviest.

United States Pat. Nos. 2,314,254 and 2,549,729 to J. G. WALLNY both disclose an apparatus in which an auxiliary belt engages a conveyor belt and has openings to which vacuum is applied by means of a stationary suction hose over which the auxiliary belt slides. However, this apparatus is designed as a belt filter for relatively light duty applications. The conveyor belt is perforated by drainage openings and the auxiliary belt is a relatively thick narrow belt, the vacuum being applied via the suction holes in the auxiliary belt to the drainage holes in the conveyor belt to promote efficient drainage of material carried on the conveyor belt. Moreover, the auxiliary belt is used as a traction belt in order to drive the conveyor belt only in the apparatus disclosed by the later patent issued to Wallny.

By the present invention it is possible to provide a conveyor belt intermediate drive for heavy duty applications in which the tractive forces which can be applied effectively are significantly increased by a suction clamping technique without the need for complicated vacuum connections.

SUMMARY OF THE INVENTION

According to the invention there is provided conveyor belt drive apparatus comprising:

an endless flexible traction belt supported in an endless loop and formed of flat belting provided on its outer face with facial pockets occupying a major part of the outer facial area of the belt and opening outwardly of the endless loop and openings extending transversely through the belt to communicate with said pockets;

traction belt drive means to drive the traction belt around said endless loop; and suction means to apply suction to the openings in the traction belt at the inner face of the traction belt as those openings traverse part of the loop whereby to create suction in the associated pockets. In use of the apparatus said part of the traction belt loop is engaged with a conveyor belt and the suction created in the facial pockets at that part of the loop provides a suction clamping action between the traction belt and the conveyor belt.

The invention further provides conveyor apparatus comprising:

a movable conveyor belt;

an endless flexible traction belt supported in an endless loop such that over a part of said loop it is aligned with and engages the conveyor belt, the traction belt being formed of flat belting having a width at least equal to a major proportion of the width of the conveyor belt and being provided in its outer face with facial pockets opening outwardly of the endless loop and openings extending transversely through the belt from the inner face of the endless loop to communicate with said pockets, said pockets being outwardly closed by the conveyor belt over said part of the endless loop;

traction belt drive means to drive the traction belt around said endless loop; and suction means to apply suction to the openings in the traction belt as they traverse said part of the loop whereby to create suction in the associated pockets providing a suction clamping action between the traction belt and the conveyor belt.

Preferably the suction means comprises at least one suction chamber structure confronting the inner face of the traction belt at said part of the traction belt loop and defining with the traction belt a substantially closed suction chamber, and the chamber structure being positioned so that at least some of said openings in the traction belt register with the chamber as the belt slides over the chamber structure.

The suction chamber may be elongated in the longitudinal direction of the belt and extend throughout a major proportion of said part of the loop.

The pockets of the traction belt may be formed by longitudinal and transverse ribs on the outer face of the traction belt. There may be a plurality of longitudinal rows of pockets spaced across the belt, in which case the suction chamber structure will be one of a plurality of such structures aligned one with each of the rows of belt openings or there may be a single row of relatively wide pockets.

Each pocket may be provided with a series of abutments standing out from the floor of the pocket to prevent or limit entry of the conveyor belt into the pocket.

The or each vacuum chamber structure may be provided with flat plate portions slidably engaged with the traction belt to cover the belt openings approaching and leaving the respective vacuum chamber whereby to isolate the vacuum chamber from communication with the atmosphere via the openings approaching and leaving the vacuum chamber.

The traction belt may slide on the vacuum chamber structure in which case there may be provided sliding seals of anti-friction material such as polytetrafluoroethylene or polyimide resin filled with appropriate reinforcing or lubricating material such as glass fibres, bronze powder or graphite particles. Such seals may be fitted to the vacuum chamber structure or to the inner face of the traction belt.

The invention also extends to a traction drive belt comprised of flat elongate belting one face of which is provided with open facial pockets occupying a major part of the area of that belt face and wherein there are openings extending through the belt between said pockets and the other side of the belt.

In order that the invention may be more fully explained, one particular embodiment will be described in detail with reference to the accompanying drawings.

BRIEF DESCRIPTION OF THE DRAWINGS

FIG. 3 is a cross-section to an enlarged scale on the line 3—3 in FIG. 2;

FIG. 4 is an enlargement of part of the structure shown in FIG. 2;

DESCRIPTION OF PREFERRED EMBODIMENT

Figure 1:
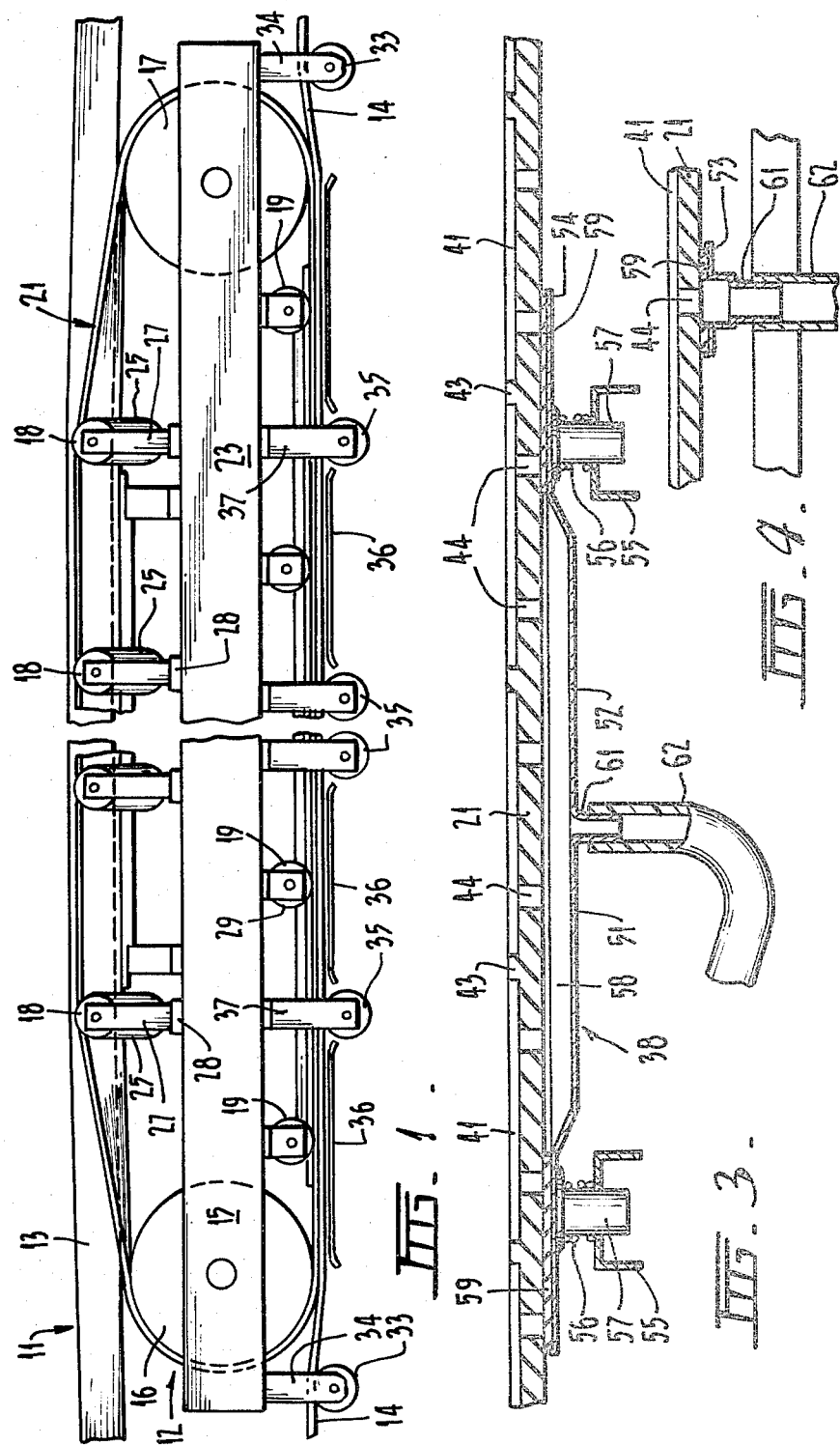
FIG. 1 is a schematic side elevation of part of a belt conveyor fitted with an intermediate drive in accordance with the present invention.
Figures 2, 5, 6:
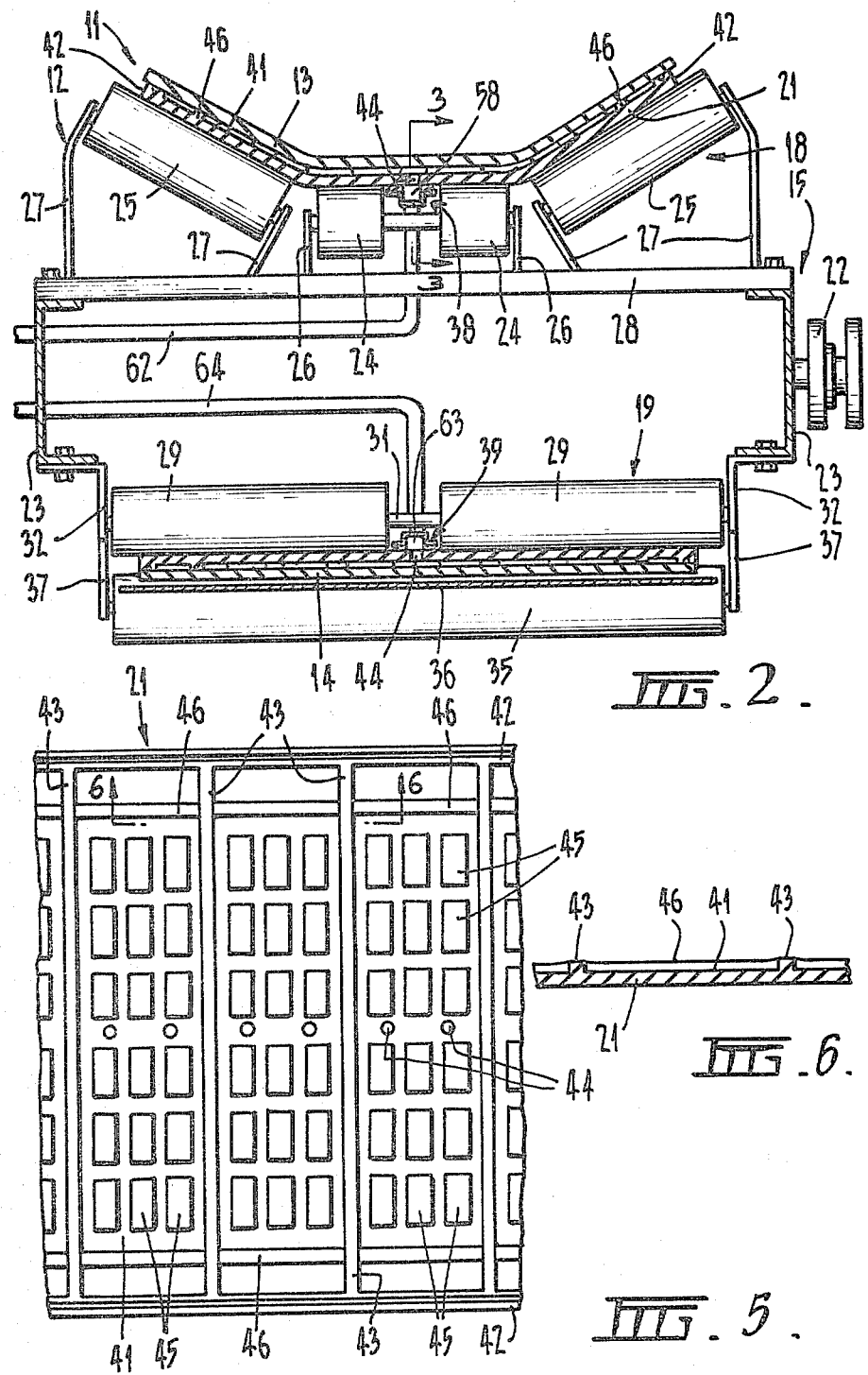
FIG. 2 is a transverse vertical cross-section through part of the belt conveyor and intermediate drive of FIG. 1.
FIG. 5 is a plan of part of a traction belt incorporated in the intermediate drive apparatus.
FIG. 6 is a cross-section on the line 6—6 in FIG. 5.

FIGS. 1 and 2 show parts of a main conveyor belt 11 engaged by an intermediate drive apparatus denoted generally as 12. More particularly, they show segments of an upper load bearing run 13 of the conveyor belt and a lower return run 14 between which the intermediate drive apparatus is mounted. The upper run 13 of main conveyor belt 11 is supported at intervals along its length with conventional idler roller sets (not shown) which hold the belt in troughed formation and the intermediate drive apparatus 12 is located between two of these idler sets. Main conveyor belt 11 is of entirely conventional construction and may, for example, be made of rubber or synthetic rubber moulded around steel cord tension members.

Intermediate drive apparatus 12 is installed to apply tractive forces to both the upper main conveyor run 13 and the lower return run 14. However, as will be described in more detail below, it is not essential to the invention that the intermediate drive apparatus should operate on the lower return run 14 of the main conveyor belt and in many applications it may operate on the upper run 13 only.

Intermediate drive apparatus 12 comprises a main frame 15 carrying end rollers 16, 17, a series of upper idler roller sets 18 and a lower series of idler roller sets 19 around which a traction belt 21 is wrapped in an endless loop. Traction belt 21 is formed of flat belting of similar width to the main conveyor belt and the idler rollers of the upper roller sets 18 are disposed in troughed formations immediately beneath the upper run 13 of main conveyor belt 11 so as to hold the upper part of the traction belt loop in snug engagement with the underside of the upper run of the main belt.

The lower return run 14 of the main conveyor belt is supported in a flat condition and the rollers of the lower idler sets 19 are all horizontal to guide the lower part of the traction belt in flat engagement with the upper face of this return run of the main belt.

End roller 17 of the intermediate drive apparatus is driven through a coupling 22 to impart traction to belt 21. The other end roller 16 may be similarly driven or it may simply be an idler roller.

The main frame 15 of the intermediate drive apparatus comprises a pair of side channel members 23 and each upper idler roller set 18 is comprised of two narrow central idler rollers 24 and two wider outer rollers 25. The shafts of rollers 24, 25 are supported between legs 26, 27 standing up from a base beam 28 spanning the side channel members 23 of the main frame and bolted to the upper flanges of those members. The two narrow idler rollers 24 are supported on legs 26 such that they support a central horizontal part of traction belt 21 with a gap between them and legs 27 support the outer rollers 25 in inclined positions to support the inclined outer parts of the troughed upper run of the traction belt.

Each of the lower idler rollers sets 19 comprises a pair of horizontal idler rollers 29 mounted on a common shaft 31 which is supported on angle brackets 32 bolted to the lower flanges of the side channel members 23 of the main frame 15. The rollers of each of these sets are spaced apart to leave a gap between them above the central part of the lower belt run.

The intermediate drive apparatus is positioned to cause a slight upward deviation in the upper run 13 of main conveyor belt 11 so that the main belt engages the traction belt 21 only over the span supported by the upper idler roller sets 18.

The lower return run 14 of the main conveyor belt is trained over a pair of horizontal rollers 33 supported from the two ends of main frame 15 by brackets 34. Rollers 33 hold the return run 14 of the main belt against the traction belt in the region of end rollers 16, 17. Between these end rollers the return run 14 of the main belt is supported against sagging movement away from the traction belt by means of further support rollers 35 and stationary slide plates 36. Support rollers 35 are mounted on brackets 37 which also depend from the side channel members 23 of main frame 15.

An upper suction chamber structure 38 extends centrally and longitudinally beneath the upper part of traction belt 21 which is supported by the idler roller sets 18. A lower suction chamber structure 39 extends longitudinally and centrally above the lower run of the traction belt 21. Structures 38, 39 form with the upper and lower runs of the traction belt suction chambers by means of which suction is applied via openings in the belt to facial pocket formed in the outer face of the traction belt so as to provide a suction clamping action between the upper run of the traction belt and the upper run of the main conveyor and a further suction clamping action between the two lower belt runs. The construction and operation of the two suction chamber structures will be explained in detail after the relevant construction of the traction belt has been described.

The outer face of traction belt 21 is formed with outwardly opening rectangular facial pockets 41. These pockets occupy a major part of the facial area of the belt. The extremeties of pockets 41 are defined by a pair of longitudinal ribs 42 standing up from the side edges of the belt and transverse ribs 43 extending between the longitudinal ribs to divide the space between the longitudinal ribs into the rectangular pockets 41. A central row of openings 44 extends transversely through the belt from the inner side of the belt loop to communicate with pockets 41. There are two of said openings 44 for each pocket 41, these two openings being located symmetrically within the pockets at a centre to centre distance equal to half the centre to centre distance of transverse ribs 43.

Each pocket is provided with a series of abutments in the form of rectangular bosses 45 standing up from the floor of the pocket in regular rows. The outer faces of the bosses are generally flush with the outer edges of ribs 42, 43 forming the side walls of the pockets and the bosses therefore prevent the main conveyor belt from entering the pockets without interfering with the application of vacuum to the extremeties of the pockets. Located within the two side ribs 42 there are additional abutments in the form of ribs 46 extending parallel with the side ribs and between the transverse ribs 43. The outer edges of abutments 46 are scalloped in the longitudinal direction such that their two ends are flush with the outer edges of the adjoining transverse ribs 43 but their midparts are about one millimeter lower than the ends. If the main conveyor belt covers the entire pocketed area of traction belt 21 and is supported by strips 42, 43 and abutments 45 there will be small openings in the form of circular segments between the surfaces of abutment ribs 46 and the adjacent face of the main conveyor belt. When suction is applied to the pockets via suction openings 44 the spaces between edge ribs 42 and rib abutments 46 can be evacuated through these segmental spaces. However, if during operation of the drive and main conveyor, the main conveyor belt should for any reason move laterally with respect to the traction belt to the extent that one of its edges is located between a side rib 42 and the adjacent rib abutment 46, that edge will be caused to rest on the rib abutment 46 due to its own edge weight, no longer supported by the edge rib 42, and by suction which would be developed by the velocity of air being sucked through the small segmental shaped opening. This helps to preserve suction within the traction belt pocket over the slightly reduced belt contact area.

Suction chamber structure 38 comprises an elongate shallow dish shaped shell 51 having a lower pan section 52, side rim flanges 53 and end rim flanges 54. Pan section 52 of this shell is embraced by a rectangular frame 55 and the shell is supported on this frame by means of helical compression springs 56 disposed about vertical tubular posts 57 depending from the shell and slidable in openings in frame 55 to locate the shell against movement in the lateral and longitudinal directions. Springs 56 bias the whole of shell 51 against the underside of traction belt 21.

A suction chamber 58 is defined between the dropped pan section 52 of shell 51 and the underface of the traction belt which passes over the shell. This chamber is effectively sealed by the engagement of the traction belt with the upper faces of the rim flanges 53, 54 of the shell. Effective sealing is ensured by fitting the rim flanges with seal strips 59 made of an anti-friction material. The seal strips may, for example, be made of polytetrafluorethylene filled with glass fibre, bronze powder or graphite or an appropriately filled polyimide resin.

Suction is applied to suction chamber 58 via a spigot connection 61 and a hose 62 extending out through one side in frame 15 where it may be connected to a vacuum pump (not shown).

In operation of the apparatus suction is applied to the facial pockets 41 in that part of the traction belt 21 which is traversing suction chamber structure 38 so that a suction clamping action is produced between the traction belt and the main conveyor belt to ensure that positive traction is provided with no slippage between the two belts. The end rim flanges 54 of the suction chamber structure are extended in the longitudinal direction to such an extent that both belt openings 44 of any pocket approaching or leaving the vacuum chamber must pass through positions in which they are both completely covered by the respective flange whereby the vacuum chamber is isolated from communication with the atmosphere via those openings.

Suction chamber 39 is constructed and mounted in similar fashion to suction chamber structure 38 but it is rather longer so as to engage a long length of the lower run of the traction belt between end rollers 16, 17. It extends centrally of the lower run of the traction belt through the gaps between the lower idler rollers 29 so that its suction chamber 63 communicates with the suction openings 44 in the lower run of the traction belt. This chamber is connected to a suction hose 64 which extends out through the same side of main frame 15 as the suction hose 62 for the upper suction chamber and the two hoses may be connected to the same vacuum pump.

When suction is applied to the lower suction chamber 63, the lower run of the main belt is held by the suction clamping action just clear of rollers 35 and plates 36. Should that suction be turned off or interrupted for any reason the main belt could sag under its own weight to open a significant gap between it and the traction belt unless it is supported. Rollers 35 and plates 36 are provided to support the main belt under these conditions so as to limit the gap between the belts to a magnitude such that, when suction is re-applied, the velocity of air through the gap will produce an air pressure reduction sufficient to lift the main belt and re-establish suction clamping between the two belts.

In a typical conveyor intermediate drive apparatus constructed in accordance with the invention, the traction belt may be approximately one meter wide and about 20 millimeters thick. It may be made by platten pressing rubber or synthetic rubber about fabric or steel cord tension members embedded within the belt. For underground mining applications, the main body of the belt could be made of polyvinylchloride or neoprene in order to meet fire regulations.

Typically, facial pockets 41 may be about 4 to 5 millimeters deep and may measure about 200 millimeters in the longitudinal direction of the belt. The pockets may extend substantially across the full width of the belt and in any event should occupy a major part of the facial area of the belt. By keeping suction openings 44 small in comparison with the size of the facial pockets it is possible to achieve maximum suction clamping between the traction belt and the main conveyor belt without generating high belt loading on the suction box structures due to the vacuum applied to the main conveyor belt. More specifically, it is preferred that the effective area of the suction openings be no more than 10% of effective area of the respective pockets.

For a one thousand millimeter wide conveyor troughed at 30° carrying material of 1400 kg/m² density and 20° surcharge at a speed of 5 meters per second, an intermediate drive apparatus constructed in accordance with the present invention would need to engage the conveyor belt over approximately 11 meters to transmit 100 kilowatts of traction driving power. An intermediate drive mechanism without the provision of suction clamping would need to be more than 80 meters long to transmit the same power. For a 1800 millimeter wide conveyor handling the same material at 5 meters per second the drive apparatus in accordance with the present invention would need to extend over approximately 22 meters to transmit 400 kilowatts of power, whereas a drive unit without suction clamping would need to be more than 100 meters long to transmit such power. Moreover, in the "empty" belt condition the 1800 millimeter unit in accordance with the present invention would be capable of transmitting approximately 350 kilowatts of power, whereas an equivalent unit without suction clamping could only transmit about 22 kilowatts.

The illustrated apparatus has been advanced by way of example only and it could be modified considerably. For example, the sliding seals between the traction belt and the vacuum chamber structure could be provided in the form of strips of the anti-friction material bonded into longitudinal troughs in the inner face of the traction belt and running on steel surfaces on the suction chamber. It would also be possible to have an auxiliary belt running between the traction belt and the suction chamber structure to form the seal. Such auxiliary belt could be a steel belt sliding over anti-friction material on the suction chamber structure or a fabric belt faced with anti-friction material to slide over steel surfaces of the chamber structure. An intermediate drive unit in accordance with the invention could provide suction clamping for the upper run of the traction belt only, in which case the lower suction box structure and the associated idler rollers would be eliminated. The apparatus may, of course, be fitted with ancillary belt cleaning and tensioning gear. It is accordingly to be understood that the invention is in no way limited to the specific configuration and structural details of the illustrated apparatus and that many modifications and variations will fall within the scope of the appended claims.

I claim:
1. Conveyor belt drive apparatus comprising:
an endless flexible traction belt supported in an endless loop and formed of flat belting provided with
(a) longitudinal and transverse ribs standing out from the outer face of the belt and so as to define between them facial pockets occupying a major part of the outer facial area of the belt,
(b) a series of abutments disposed so that a plurality of said abutments stand out from the floor of each pocket, the outer surfaces of the abutments and the outer edge surfaces of the longitudinal and transverse ribs being substantially flush with one another throughout the length of the belt, and
(c) a series of openings spaced longitudinally of the belt and extending transversely through the belt from the inner face of the endless loop to communicate with said pockets;
traction belt drive means to drive traction belt around said endless loop; and
suction means to apply suction to the openings of the traction belt at the inner face of the traction belt as those openings transverse part of the loop whereby to create suction in the associated pockets.

2. Conveyor belt drive apparatus as claimed in claim 1, wherein each pocket substantially across the complete width of the traction belt, said openings are located centrally of the belt and the effective area of said openings is no more than 10% of the effective area of the respective pockets.

3. Conveyor belt apparatus comprising:
movable conveyor belt formed of flat belting and extending through a substantially straight run;
an endless flexible traction belt supported in an endless loop such that over a part of said loop it engages the conveyor belt over a part of said run; the traction belt being formed of flat belting having a width at least equal to a major proportion of the width of the conveyor belt belting so that over said part of its loop the traction belt engages the conveyor belt over a major proportion of the conveyor belt width; the traction belt being provided at its outer face with facial pockets opening outwardly of said loop and being outwardly closed by the conveyor belt along said part of loop, said pockets occupying a major part of the outer facial area of the traction belt and also occupying a major part of the area of engagement between the traction belt and the conveyor belt; the traction belt also being provided with a series of longitudinally spaced openings extending transversely through the traction belt from the inner face of the endless loop to communicate with said pockets;
traction belt drive means to drive the traction belt around said endless loop; and
suction means to apply suction to the openings in the traction belt as they traverse said part of the loop whereby to create suction in the associated pockets providing a suction clamping action between the traction belt and the conveyor belt wherein each pocket of the traction belt is provided with a series of abutments standing out from the floor of the pocket to inhibit entry of the conveyor belt into the pocket.

4. Conveyor apparatus as claimed in claim 3, wherein each pocket extends over a major part of the width of the traction belt.

5. Conveyor apparatus comprising:
a movable conveyor belt;
an endless flexible traction belt supported in an endless loop such that over a part of the said loop it is algined with and engages the conveyor belt, the traction belt being formed of flat belting having a width at least equal to a major proportion of the width of the conveyor belt and being provided at its outer face with longitudinal and transverse ribs defining rectangular facial pockets distributed over a major part of the outer facial area of the traction belt and opening outwardly of the endless loop but being outwardly closed by the conveyor belt over said part of the endless loop, said traction belt also being provided with openings extending transversely through the belt from the inner face of the endless loop to communicate with said pockets and outer facial abutments disposed within the pockets so that each pocket is provided with a series of said abuments standing out from the floor of the pocket to inhibit entry of the conveyor belt into the pocket;
traction belt drive means to drive the traction belt around said endless loop; and
suction means to apply suction to the openings in the traction belt as they traverse said part of the loop whereby to create suction in the associated pockets providing a suction clamping action between the traction belt and the conveyor belt.

6. Conveyor apparatus as claimed in claim 5, wherein each pocket extends over a major part of the width of the traction belt.

7. Conveyor apparatus as claimed in claim 5, wherein the traction belt is of substantially the same width as the conveyor belt and said pockets extend substantially across the complete width of those belts.

8. A traction drive belt comprised of flat elongate belting one face of which is provided with longitudinal and transverse ribs defining between them open facial pockets occupying a major part of the area of that belt face and a series of facial abutments distributed through said pockets such that a plurality of said abutments stand out from the floor of each pocket with the outer surfaces of said abutments flush with the outer edge surfaces of said longitudinal and transverse ribs throughout the length of the belt and wherein there are openings extending through the belt between said pockets and the other side of the belt.

9. Traction belt as claimed in claim 8, wherein said pockets are of rectangular shape and extend substantially across the full width of the belt and wherein the effective area of said openings is no more than 10% of the effective area of the respective pockets.

* * * * *